(12) United States Patent
Johnson et al.

(10) Patent No.: US 7,032,843 B1
(45) Date of Patent: Apr. 25, 2006

(54) MIXING NOZZLE

(75) Inventors: Daniel Kent Johnson, Wichita, KS (US); Charles David Larson, Wichita, KS (US); Brad Roy Stoskopf, Wichita, KS (US)

(73) Assignee: Westland Corporation U.S.A., Inc., Wichita, KS (US)

( * ) Notice: Subject to any disclaimer, the term of this patent is extended or adjusted under 35 U.S.C. 154(b) by 0 days.

(21) Appl. No.: 10/832,167

(22) Filed: Apr. 26, 2004

Related U.S. Application Data

(60) Provisional application No. 60/465,083, filed on Apr. 24, 2003.

(51) Int. Cl.
*B05B 1/34* (2006.01)

(52) U.S. Cl. ...................... 239/488; 239/500
(58) Field of Classification Search ............... 239/463, 239/466, 467, 474, 486, 487, 488, 489, 500, 239/501
See application file for complete search history.

(56) References Cited

U.S. PATENT DOCUMENTS

| | | |
|---|---|---|
| 3,486,192 A | 12/1969 | Le Roy |
| 3,587,450 A | 6/1971 | Smith |
| 3,652,064 A | 3/1972 | Lehnen et al. |
| 3,788,614 A | 1/1974 | Gregory |
| 3,941,535 A | 3/1976 | Street |
| 4,085,461 A | 4/1978 | Maillefer |
| 4,215,978 A | 8/1980 | Takayama |
| 4,218,146 A | 8/1980 | Ingen Housz |
| 4,227,870 A | 10/1980 | Kim |
| 4,277,182 A | 7/1981 | Kruder |
| 4,285,600 A | 8/1981 | Kruder |
| 4,330,214 A | 5/1982 | Willert |
| 4,341,474 A | 7/1982 | Wheeler, Jr. et al. |
| 4,356,140 A | 10/1982 | Kruder |
| 4,363,768 A | 12/1982 | Kruder |
| 4,388,262 A | 6/1983 | Brasz et al. |
| 4,405,239 A | 9/1983 | Chung et al. |
| 4,444,507 A | 4/1984 | Dray |
| 4,639,143 A | 1/1987 | Frankland, Jr. |
| 4,752,136 A | 6/1988 | Colby |
| 4,802,140 A | 1/1989 | Dowling |
| 4,944,906 A | 7/1990 | Colby et al. |
| 4,964,730 A | 10/1990 | Alzner et al. |
| 5,056,925 A | 10/1991 | Klein |
| 5,071,256 A | 12/1991 | Smith et al. |
| 5,215,764 A | 6/1993 | Davis et al. |
| 5,318,357 A | 6/1994 | Colby et al. |
| 5,342,125 A | 8/1994 | Myers |

*Primary Examiner*—Christopher Kim

(57) ABSTRACT

The mixing nozzle of the present invention generally includes a casing and mixer. The mixer fits within the casing and includes alternating elongated helical flow directing lands and notched barrier lands. The flow directing lands extend from the body and seal against the inside wall of the casing. The barrier lands also extend from the body but are offset from said inside wall of the casing. The flow directing lands and the barrier lands have differing helix angles and thus define alternating converging inlet channels and diverging outlet channels. Mixing of molten plastic is accomplished when the molten plastic is received from the inlet end of the mixing portion primarily by the inlet channels, passes over the barrier lands and through the notches in the barrier lands and passes primarily via the outlet channels through the outlet end of the mixer.

14 Claims, 8 Drawing Sheets

MIXING NOZZLE

CROSS REFERENCES TO RELATED APPLICATIONS

This application claims the benefit of U.S. Provisional Patent Application No. 60/465,083 filed Apr. 24, 2003.

FIELD OF THE INVENTION

This invention relates to a mixing nozzle that receives extrudate from an extruder or an injection screw and mixes the extrudate prior to further processing.

BACKGROUND OF THE INVENTION

Injection nozzles are used to inject extrudate from an extruder screw or an injection screw prior to further processing. Such further processing might include extrusion through a die to produce a continuos extruded shape or injection into an injection mold to produce a molded part.

In order to reduce inventory costs, operators often feed standard, uncolored thermoplastic pellets and colored pigments into an extrusion or an injection machine to produce colored plastic products. Other additives may be added to thermoplastic for a variety of purposes. Such additives might include glass fibers, glass beads, steel powder, calcium and even animal fat. It is usually important to the quality of the resulting product that these additives are evenly mixed with the thermoplastic. It is also important that resulting mixture be uniform, isothermal and relatively free of material degradation.

Operators who produce a wide variety of products often employ machines having standard injection or extrusion barrels and screws capable of processing a wide variety of thermoplastic materials. Such standard equipment is often not well adapted for optimally mixing a particular thermoplastic material and a pigment to produce an evenly colored product. Inadequate mixing causes streaks in the product due to contrasting areas have heavy and light pigment. Often excess amounts of costly pigment are used to compensate for inadequate mixing. Consequently, there is often a need for a mixing nozzle which can be mounted to an extrusion or injection machine that will receive molten thermoplastic material and pigment from the extrusion or injection machine and mix the thermoplastic and the pigment more completely prior to further processing. Still further, since excessive shear and compression of an extrudate can elevate the temperature of the extrudate and degrade its material properties, there is a need for a mixing nozzle that mixes extrudate thoroughly while subjecting it to minimum amounts of heat producing shear and compression.

BRIEF DESCRIPTION OF THE INVENTION

In an embodiment of the present invention the aforementioned problem is addressed by providing a mixing nozzle for mounting to a thermoplastic processing machine such as an extruder barrel screw arrangement or an injection barrel screw arrangement. The mixing nozzle is designed to receive a flow of extrudate from an extruder screw or an injection screw and mix the extrudate prior to further process steps such as extrusion through a die or injection into a mold. The primary objective of the mixing nozzle is to mix the flow of extrudate while subjecting it to minimal amounts of shear and compression. The term extrudate used here should be understood as including molten thermoplastic and any additives which may have been added to the molten thermoplastic.

The mixing nozzle includes a mixer mounted inside a casing. The casing generally includes an inlet portion at the upstream end, a mixing portion and an outlet portion at the downstream end. The inlet and outlet portions of the casing have relatively narrow passages while the mixing portion has a larger diameter passage for accommodating the mixer. A diverging passage extends between the inlet passage and the mixing passage of the casing and a converging portion extends between the mixing portion and the outlet portion of the casing. The mixer is mounted within the casing in a stationary manner and includes a diverging nose portion for placement within the diverging passage of the casing, a generally cylindrical body portion for placement within the mixing portion of the casing and a converging tail portion for placement within the converging portion of the casing. Extending longitudinally from the upstream end to the downstream end of the body of the mixer and also extending radially from the surface of the mixer are alternating pairs of flow directing lands and barrier lands. The flow directing lands seal against the inside wall of the casing while the barrier lands are offset from the inside wall of the casing. The barrier lands also have transverse notches for promoting mixing and throughput. The flow directing lands and the barrier lands describe helixes as they wrap around the body of the mixer. The helix angles of the barrier lands are greater than the helix angles of the flow directing lands. Accordingly, adjacent pairs of flow directing lands and barrier lands that diverge at the upstream end of the mixer and converge at the downstream end of the mixer define converging inlet channels which communicates primarily with the inlet end of the housing. Adjacent pairs of flow directing lands and barrier lands that converge at the upstream end of the mixer and diverge at the downstream end of the mixer define diverging outlet channels which communicates primarily with the outlet end of the housing.

Mixing of molten plastic occurs when the molten plastic is divided as it is received from the inlet portion primarily by the inlet channels, passes over the barrier lands and is further divided as it passes through the notches in the barrier lands into the outlet channels and then is recombined as it passes primarily via the outlet channels to the outlet end of the casing. As the flow of extrudate passes into the inlet channels, between the inlet channels and the outlet channels and out through the outlet channels, the flow is successively separated and later recombined to accomplished a relatively gentle mixing action with minimized shear and compression.

DETAILED DESCRIPTION OF THE INVENTION

Figure 1:
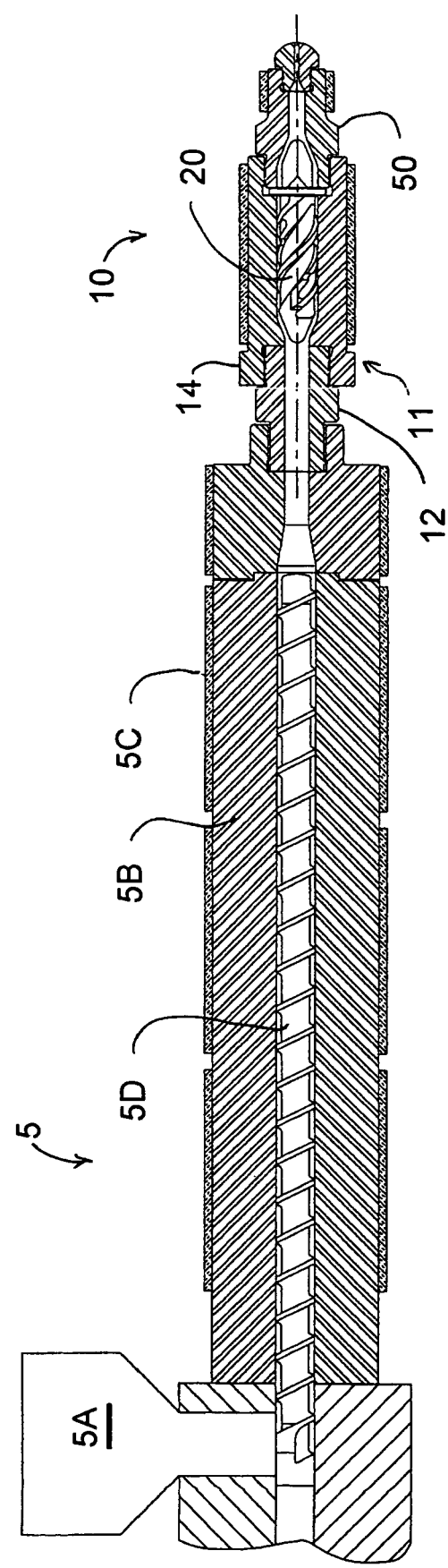
FIG. 1 is a cross section view of the mixing nozzle shown attached to a thermoplastic processing machine.

Referring to the drawings, FIGS. 1–7A show a mixing nozzle 10 in accordance with an embodiment of the present invention. As can be seen in FIG. 1, mixing nozzle 10 is shown mounted to a thermoplastic processing machine 5. Thermoplastic processing machine 5 generally represents either an injection machine or an extrusion machine. Processing machine 5 includes a hopper 5A for receiving thermoplastic pellets and additives such as colorants, a barrel 5B having an axial bore extending from the inlet end of the barrel to the outlet end of barrel 5B, heating elements 5C and a screw 5D which forces the melting thermoplastic material toward the outlet end of the barrel as screw 5D rotates within barrel 5B. The drive means for rotating screw 5D is not shown. In an injection machine, the drive machine would not only rotate screw 5D to push thermoplastic toward the outlet end of barrel 5B but also periodically reciprocate screw 5D to inject extrudate into an injection mold. As can be seen in FIG. 1, mixing nozzle 10 includes a casing 11 a mixer 20 mounted within casing 11.

Figure 2:
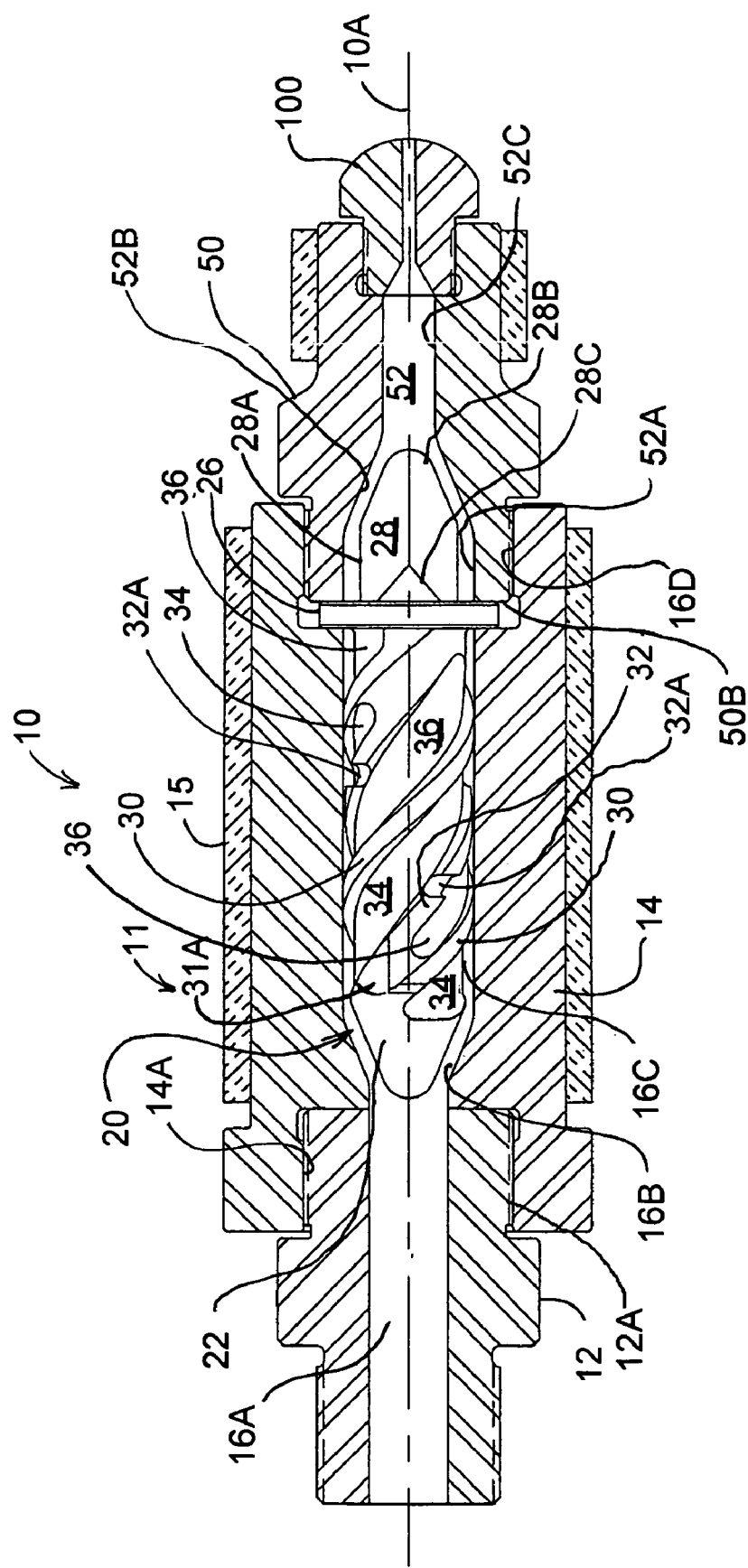
FIG. 2 is a cross section view of the mixing nozzle.
Figure 3:
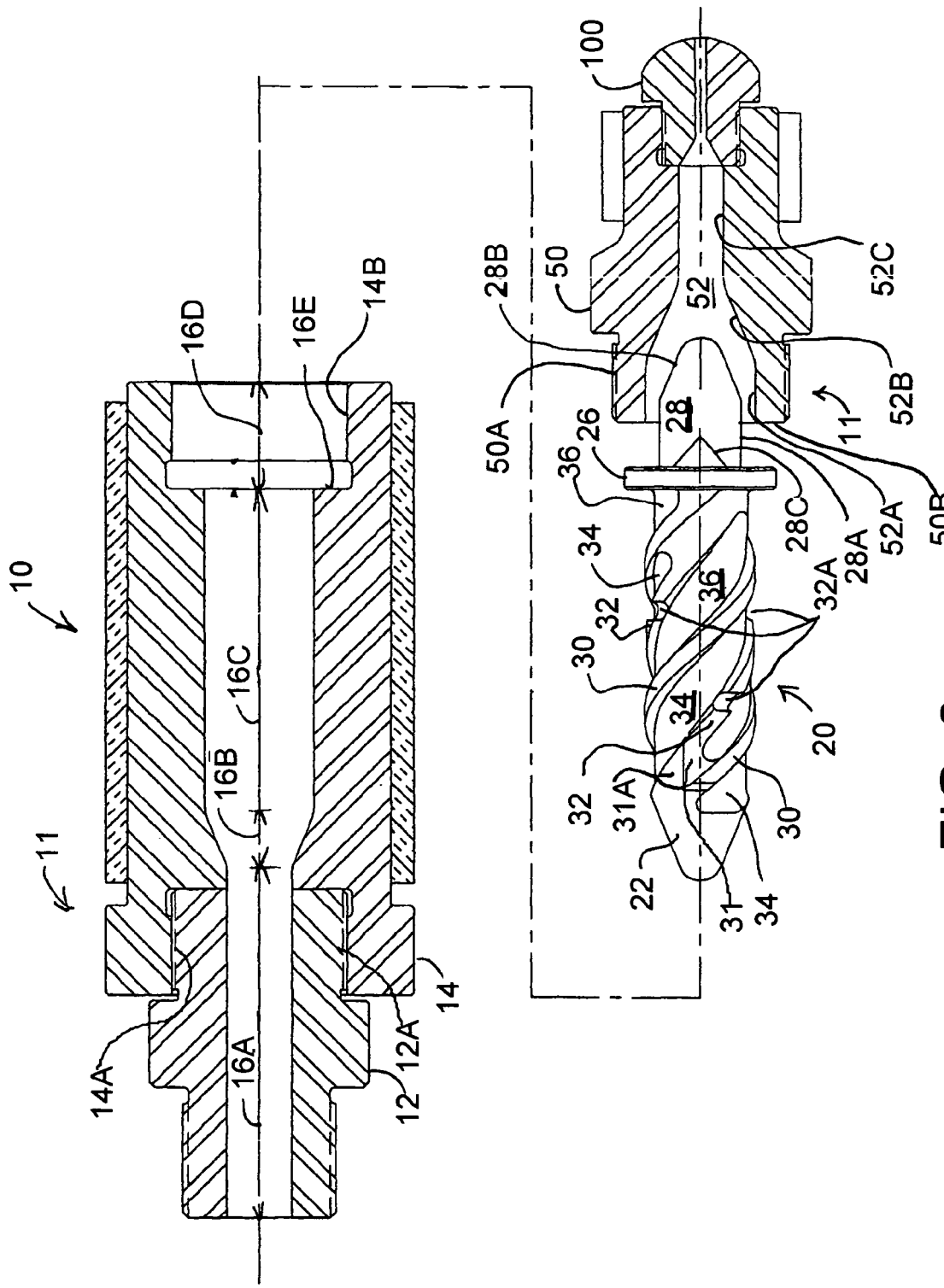
FIG. 3 is an exploded cross section view of the mixing nozzle.

Mixing nozzle 10 is shown in greater detail in FIGS. 2 and 3. As can be seen in FIGS. 2 and 3, casing 11 and mixer 20 are generally radially symmetric about a nozzle axis 10A. The components of mixing nozzle 10 are preferably fashioned from a hard steel capable of withstanding the temperature, abrasion and high pressure (often as high as 35,000 psi) of hot extrudate.

Casing 11 further includes an inlet portion 12, a mixing portion 14 and an outlet portion 50. Inlet portion 12, mixing portion 14 and outlet portion 50 are assembled by engaging corresponding threaded surfaces 12A and 14A and threaded surfaces 14B and 50A. The disassembly of inlet portion 12 from mixing portion 14 provides access to mixer 20 so that mixer 20 may be easily removed after use. A standard nozzle tip 100 is shown threaded to the downstream end of outlet portion 50. Nozzle tip 100 is representative of the type of tip for engaging an injection mold. Mixing portion 14 may be partially surrounded by a thermal element 15 which would most generally be used to maintain mixing portion 14 within a desired elevated temperature range suitable for maintaining thermoplastic material in a melted condition.

Inlet portion 12, mixing portion 14 and outlet portion 50 of casing 11 present an axial passage for the passage of extrudate. This axial passages widens in mixing passage 16C to accommodate mixer 20. As can be best seen in FIG. 3, the axial passage presented by inlet portion 12 and mixing portion 14 can be further divided into an inlet passage 16A, a diverging passage 16B, a mixing passage 16C and a shoulder portion 16D. Inlet passage 16A receives extrudate from the outlet end of barrel 5B shown in FIG. 1. Mixing passage 16C has a larger diameter than inlet passage 16A. Diverging passage 16B is a bounded by diverging surface communicating between inlet passage 16A and mixing passage 16C. A seal face 16E extends between mixing passage 16C and the wider shoulder portion 16D. Shoulder portion 16D has a threaded inside surface 14B for receiving a threaded outside surface 50A of outlet portion 50.

Outlet portion 50 has an axial bore 52 extending from upstream end to its downstream end. Axial bore 52 is further divided into a first cylindrical portion 52A, a second converging portion 52B and a third cylindrical portion 52C. Mounted at the outlet end of outlet portion 50 is an optional nozzle tip 100. Nozzle tip 100 shown in FIGS. 1–3 and 5 is intended for engaging an injection molding device and is merely an example of a component that would be mounted at the outlet end of outlet portion 50. A different type of tip such as an extrusion die might be mounted to the outlet end in lieu of nozzle tip 100 to support an extrusion process. As will be described in greater detail below, a tail flange 26 extending from the outlet end of mixer 20 is interposed between seal face 50B of outlet portion 50 and seal face 16E of mixing portion 14.

Mixer 20 is primarily mounted within mixing portion 14 and also extends into outlet portion 50. Mixer 20 includes a nose portion 22, a body portion 24, a tail flange 26 and a tail portion 28. Nose portion 22 has a blunt cone shape which generally corresponds with diverging passage 16B of axial passage 16. Tail portion 28 includes a cylindrical section 28A and a blunt cone portion 28B which is generally similar in shape to nose portion 22. The surfaces of cylindrical section 28A and blunt cone portion 28B are generally shaped for a constant offset relationship with first cylindrical portion 52A and second converging portion 52B of bore 52. Extending from tail flange 26, on opposite sides of cylindrical section 28A are converging lands 28C. Converging lands 28C extend from the surface of cylindrical portion 28A and seal with the inside surface of first cylindrical portion 52A of bore 52. The function of converging lands 28C will be described in greater detail below.

Body portion 24 of mixer 20 includes flow directing lands 30 and barrier lands 32. Flow directing lands 30 are spaced around body portion 24 and extend longitudinally in a helical fashion between the upstream end and downstream end of body portion 24. Flow directing lands 30 also extend radially from body portion 24 and seal with the inside wall of mixing portion 14 thus presenting impassable walls for directing the flow of extrudate. Barrier lands 32 extend a portion of the distance from body portion 24 to the inside wall of mixing portion 14 and are thus offset from the inside wall of mixing portion 14.

Figures 4A, 4B:
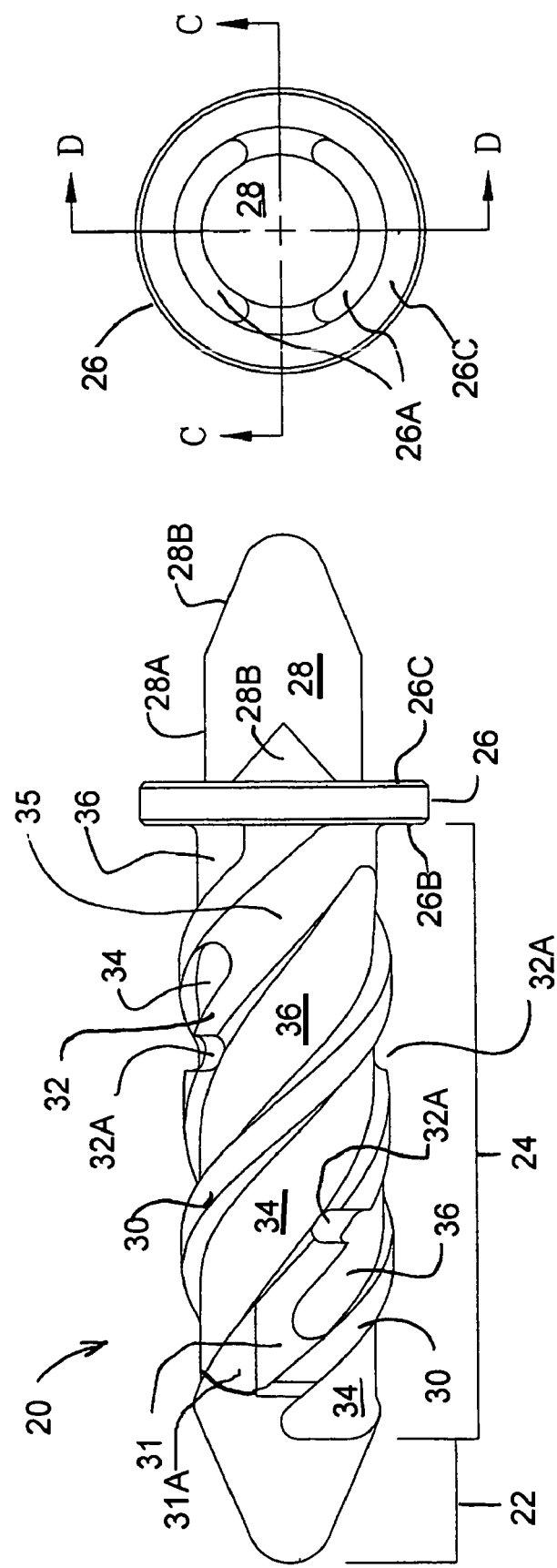
FIG. 4A is a side view of the mixer.
FIG. 4B is a end view of the mixer.
Figure 6:
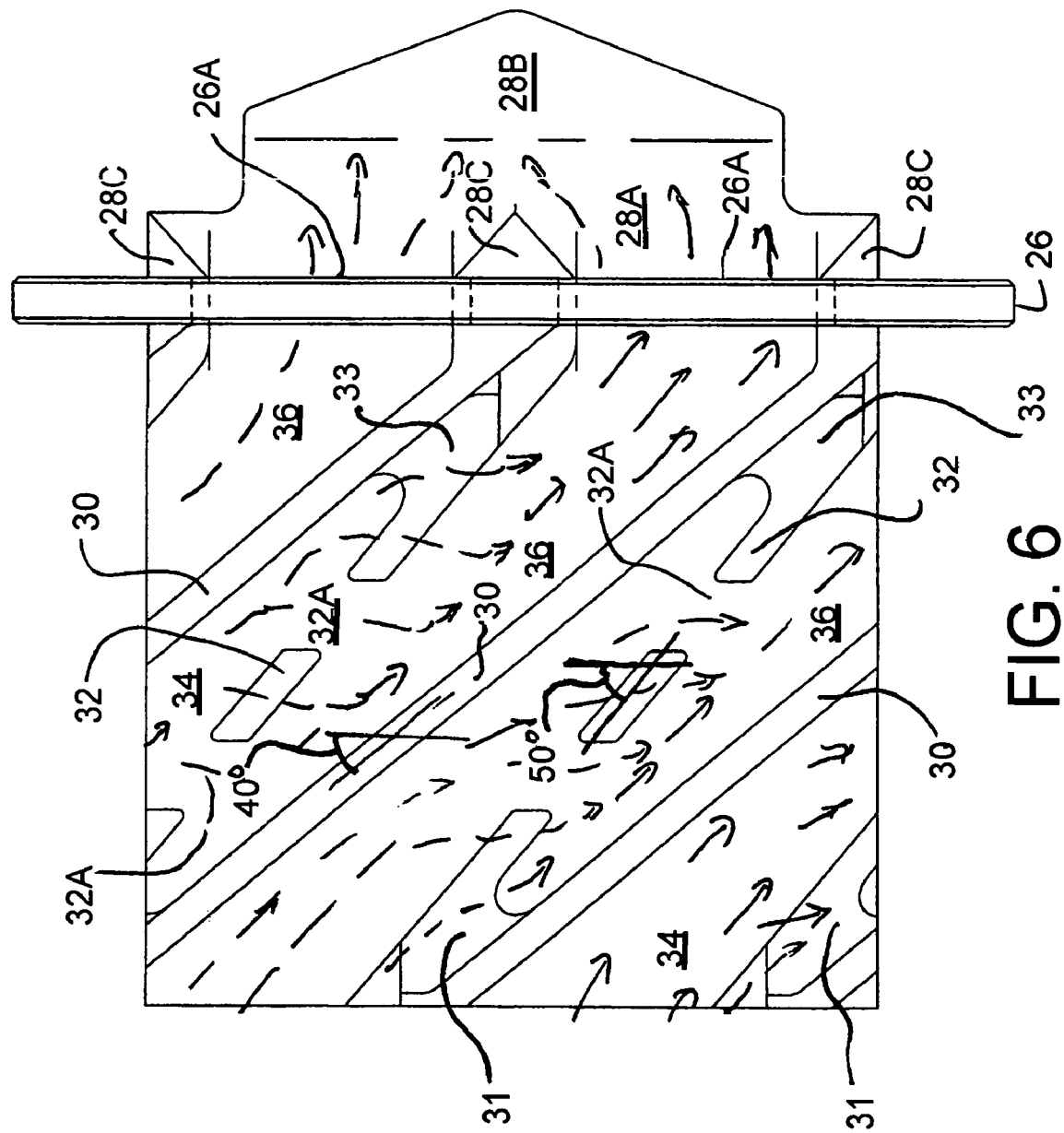
FIG. 6 is a planar projection of the surface of the mixer shown in FIG. 4A.

FIG. 6 is a planar projection of the portion of the surface of mixer 20 indicated in FIG. 4A. FIG. 6 illustrates the surface features of mixer 20. As can be best seen in FIG. 6, the helix angles of barrier lands 32 are greater than the helix angles of the flow directing lands 30 such that barrier lands 32 and flow directing lands 30 form pairs of alternating inlet channels 34 and outlet channels 36. As shown in FIG. 6, barrier lands 32 are set at a helix angle of approximately 50° while flow directing lands 34 are set at a helix angle of approximately 40°. An inlet channel 34 formed between a flow directing land 30 and an adjacent barrier land 32 becomes wider toward the upstream end of mixer 20 and narrows toward the downstream end of mixer 20 as barrier land 32 widens into a downstream offset surface 33 adjacent to flow directing land 30. An outlet channel 36 formed between a barrier land 32 and an adjacent flow directing land 30 narrows toward the inlet end of mixer 20 and widens toward the outlet end of the mixer 20. An upstream offset surface 31 is formed where barrier land 32 widens as it meets flow directing land 30. A flat surface 31A facets between offset surface 31 and the conical surface of nose portion 22. Barrier lands 32 include transverse notches 32A which facilitate the flow of extrudate material from inlet channels 34 to outlet channels 36.

Figure 4D:
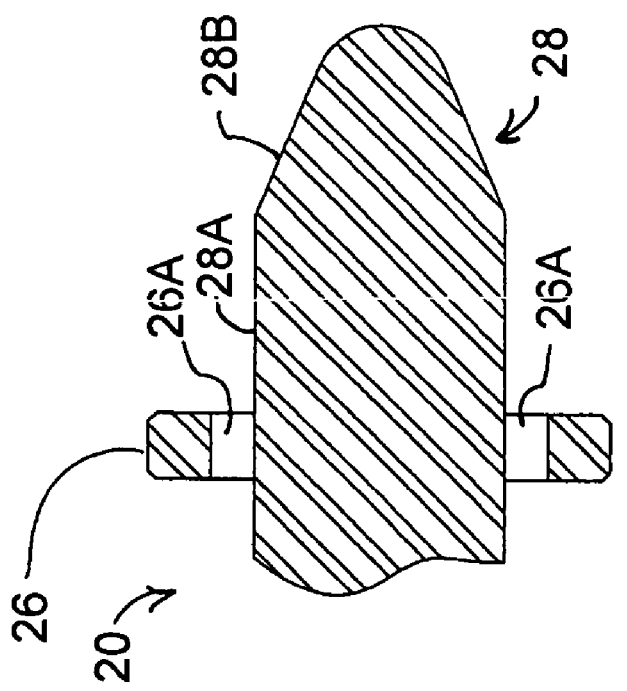
FIG. 4D is cross sectional view of the tail portion of the mixer taken from plane D—D of FIG. 4B
Figure 4C:
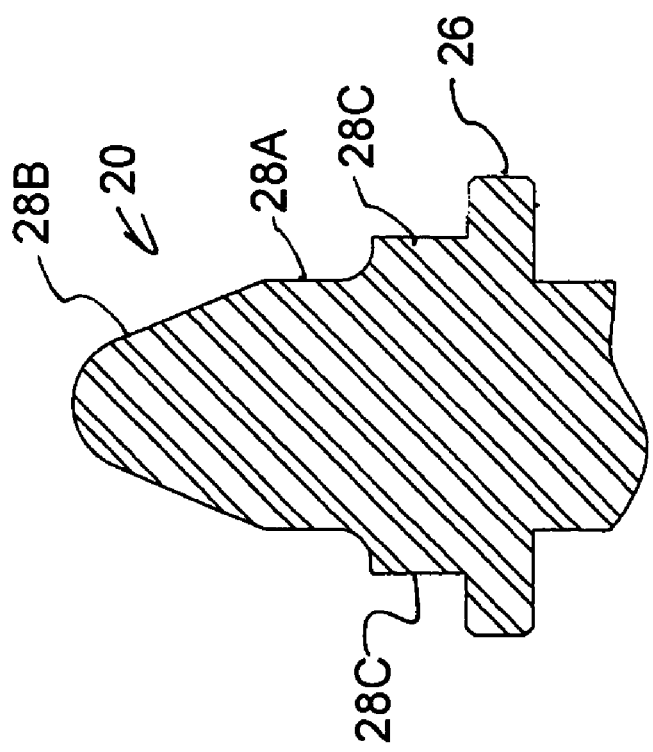
FIG. 4C is cross sectional view of the tail portion of the mixer taken from plane C—C of FIG. 4B.

Tail flange 26 provides a means for mounting mixer 20 within casing 11. As can be seen in FIGS. 4A and 4B, tail flange 26 extends radially from the tail end of the mixer 20. FIGS. 4B and 4D show that tail flange 26 includes radial channels 26A as well as a forward seal face 26B and a rear seal face 26C. Radial channels 26A provide passageways for the flow of extrudate from mixing portion 14 into rear outlet portion 50. Tail flange 26 is shaped to seal between outlet portion 50 and mixing portion 14. As outlet portion 50 is threaded into mixing portion 14, forward seal face 26B of tail flange 26 seals with seal face 16E of mixing portion 14 and as rear seal face 26C of tail flange 26 seals with seal face 50B of outlet portion 50. As mixer 20 is secured between outlet portion 50 and mixing portion 14 in the position shown in FIG. 2, the seal between tail flange 26, mixing portion 14 and outlet portion 50 must be capable of withstanding the significant pressure of the extrudate.

Figure 5:
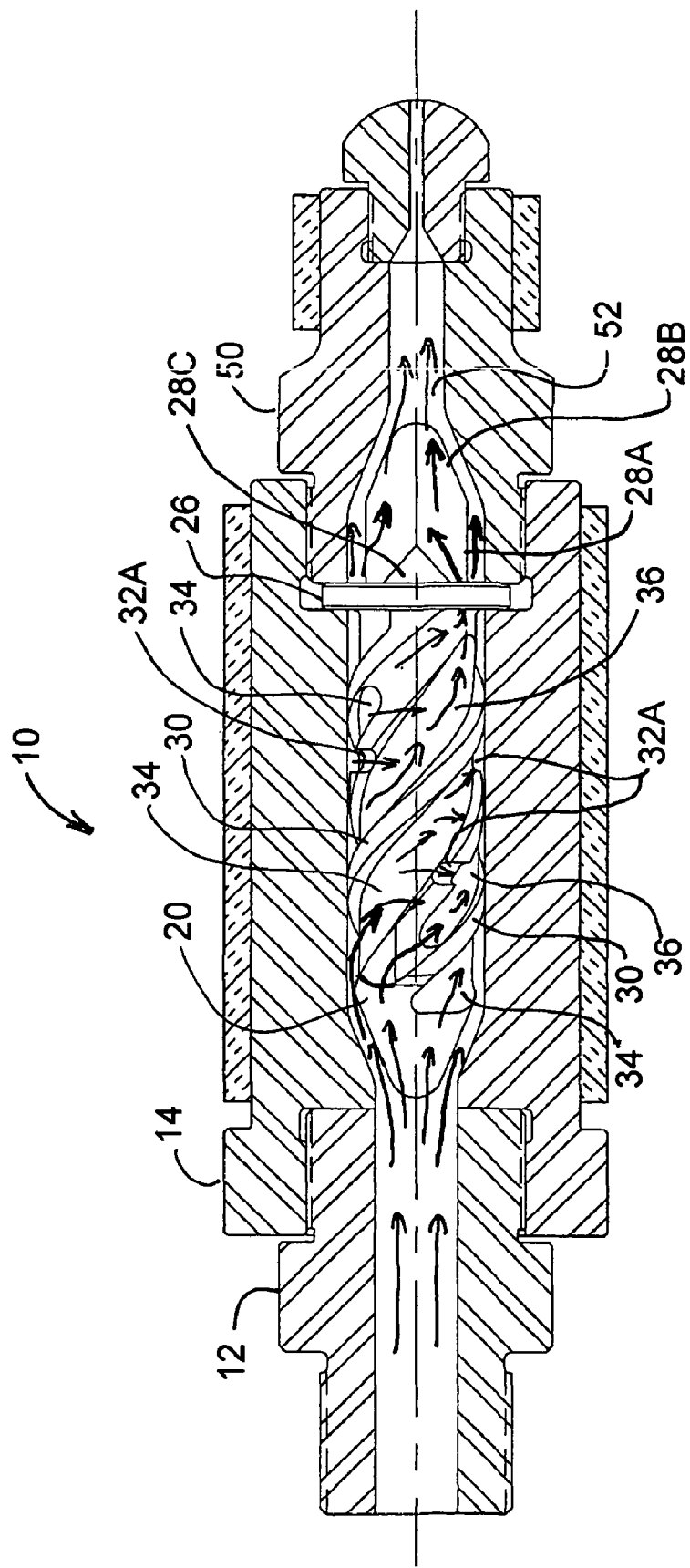
FIG. 5 is a cross section view of the mixing nozzle with arrows indicating the flow of extrudate through the mixing nozzle.

FIG. 5 illustrates the flow of extrudate through mixing nozzle 10. FIG. 6 presents a flat projection of body portion 24 as well as tail flange 26 and tail portion 28. FIG. 6 illustrates the flow of extrudate between body portion 24 of mixer 20 and mixing portion 14 of casing 11. As is shown in FIG. 5, extrudate initially flows into inlet portion 12 and into mixing portion 14 where it encounters nose portion 22 of mixer 20. As is shown in FIG. 6, the extrudate flows around nose portion 22 and is mostly divided into inlet channels 34 as it begins to flow between body portion 24 of mixer 20 and mixing portion 14. Also, as can be seen in FIGS. 5 and 6, a relatively small portion of the extrudate enters outlet channels 36 at the upstream end of mixer 20 via upstream offset surface 31. The extrudate flows from an inlet channel 34 to an outlet channel 36 via the offset spaces between barrier land 32 and the inside surface of mixing portion 14 and via the transverse notches 32A in barrier lands 32. When extrudate flows from an inlet channel 34 to outlet channel 36, the flow is divided into separate streams as separate portions of the flow pass through each notch 32A. At the same time, extrudate is also flowing over barrier land 32. These various separate portions of the flow are then recombined in outlet channel 36 to accomplish a relatively gentle mixing action. After most of the flow of extrudate mixes and gathers in outlet channels 36, it flows past the outlet end of mixer 20 through channels 26A in tail flange 26. In addition to the extrudate exiting via outlet channels 36 a small portion of the extrudate flow exits from inlet channels 34 at the outlet end of mixer 20 via downstream offset surfaces 33 and combines with the flow leaving outlet channels 36. This combined flow, consisting primarily of extrudate from outlet channels 36, is further mixed as it passes through channels 26A of tail flange 26, converges around converging lands 28C and flows around tail portion 28 and finally flows into third cylindrical portion 52C of outlet portion 50.

Figure 7:
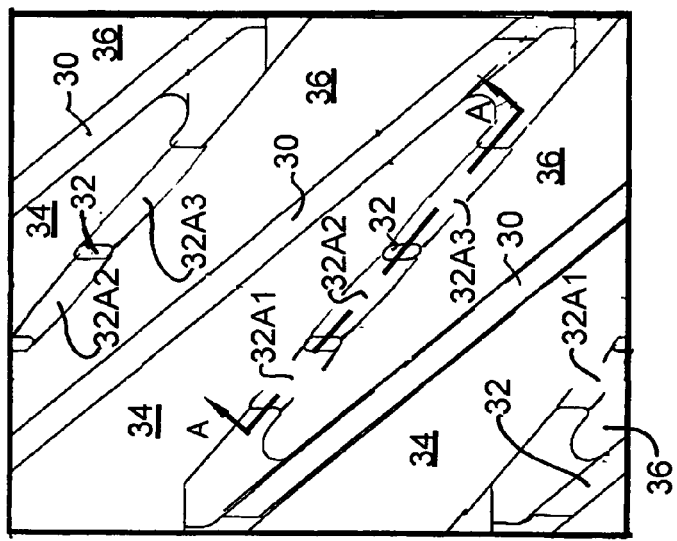
FIG. 7 is a planar projection of the surface of a mixer similar to the mixer shown in FIG. 4A but having a different configuration of notches.
Figure 7A:
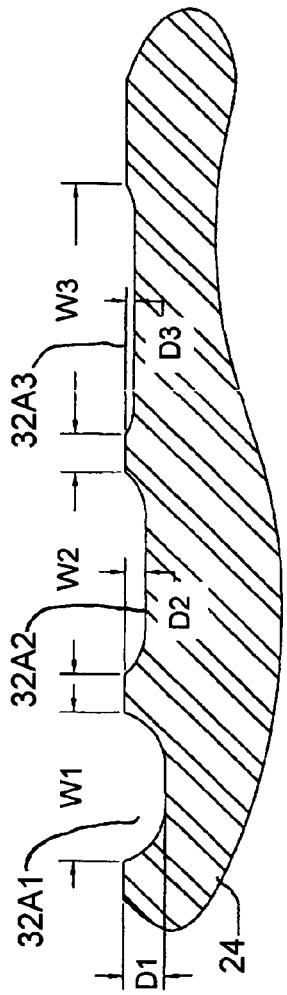
FIG. 7A is a cross section of a barrier land taken from plane A—A of FIG. 7.

FIG. 7 presents a second flat projection of body portion 24. The configuration of body portion 24 shown in FIG. 7 is identical to that shown in FIG. 6 except that in FIG. 7, notches 32A have been replaced by notches 32A1, 32A2 and 32A3. Generally, notches 32A1, 32A2 and 32A3 increase in width in the downstream direction while increasing in depth in the upstream direction. Notches 32A1, 32A2 and 32A3 are also configured to have generally equivalent cross sectional areas. The extrudate flows from an inlet channel 34 to an outlet channel 36 via the offset spaces between barrier land 32 and the inside surface of mixing portion 14 and via the transverse notches 32A1, 32A2 and 32A3. Concurrent with the flow of extrudate passing over barrier land 32 in to outlet channel 36, a first stream of extrudate passes into outlet channel 36 through notch 32A1. The stream from notch 32A1 is then combined with a second wider yet shallower stream from notch 32A2. The combined stream from flow over barrier land 32, notch 32A1 and notch 32A2 is then combined with an even shallower and wider stream from notch 32A3. When extrudate flows from an inlet channel 34 to outlet channel 36, the flow is divided into separate streams as separate portions of the flow pass through notches 32A1, 32A2 and 32A3. At the same time, extrudate is also flowing over barrier land 32. These various separate portions of the flow are then recombined in outlet channel 36 to accomplish a relatively gentle mixing action.

It is preferable that the flow area available between the various surfaces of mixer 20 and mixing portion 14 as well as outlet portion 50 remain generally constant. Accordingly the flow area between nose portion 22 of mixer 20 and forward mixing portion 14 should preferably be approximately the same as the flow area available through the inlet portion 12. Similarly, the flow area available to the extrudate as it flows through the inlet and outlet channels of mixer 20 and between the inlet and outlet channels of mixer 20 should also remain generally constant. The availability of a generally constant flow area down most of the length of mixing nozzle 10 allows mixing to occur in an efficient stirring fashion and in a fashion that minimizes compression and shear in the material. It is well known in the art that compression and shear in a thermoplastic extrusion or injection process increases the energy requirements of the process and can degrade the extrudate.

Accordingly, the present mixing nozzle provides an efficient device for mixing extrudate that can be easily integrated within a plastic extrusion or molding process. Mixing nozzle 10 receives a flow of extrudate and mixes it in a low shear, low compression stirring fashion such that the extrudate experiences a sufficient amount of disruption to accomplish mixing with a minimal amount of degradation. This low shear, low compression mixing also reduces the amount of back pressure added to the system while maintaining a high degree of mixing.

It is to be understood that while certain forms of this invention have been illustrated and described, it is not limited thereto, except in so far as such limitations are included in the following claims and allowable equivalents thereof:

Having thus described the invention, what is claimed as new and desired to be secured by Letters Patent is:

1. A mixing nozzle for mixing extrudate, comprising:
  (a) a casing having an inlet portion for receiving extrudate, a mixing portion and an outlet portion for discharging extrudate, said casing including a passage extending between the upstream end of said inlet portion and the downstream end of said outlet portion,
  (b) a generally stationary mixer fitting within said passage of said casing, said mixer including:
  (i) a body portion,
  (ii) a tail flange for clamping between said mixing portion and said outlet portion of said casing, said tail flange including radial passages for conducting molten plastic from said mixing portion of said casing to said outlet portion of said casing,
  (iii) elongated flow directing lands disposed upon said body portion extending from the upstream end of said body portion to the downstream end of said body portion and extending radially to seal against the inside wall of said casing, said flow directing lands having a first helix angle, (iv) elongated barrier lands disposed upon said body portion extending from the upstream end of said body portion to the downstream end of said body portion in a paired alternating relationship with said flow directing lands, said barrier lands offset from the inside wall of said casing, at least one of said barrier lands including at least one notch for transverse flow of molten plastic across said barrier lands, said barrier lands having a second helix angle that is greater than said first helix angle, (v) inlet channels defined by first pairs of flow directing lands and barrier lands, said inlet channels converging in the downstream direction such that said inlet channels are relatively closed in the downstream direction and relatively open in the upstream direction for communication with the upstream end of said casing, (vi) outlet channels defined by second alternating pairs of barrier lands and flow directing lands, said outlet channels diverging in the downstream direction such that said outlet channels are relatively closed in the upstream direction and relatively open in the downstream direction for communication with said downstream end of said casing, whereby said extrudate is received by said inlet end of said casing and is received primarily by said inlet channels, passes over said barrier lands and through said at least one notch of said at least one barrier land and into said outlet channels in a mixing fashion and flows to said downstream end for discharge in an increasingly mixed condition.

2. The mixing nozzle of claim 1, wherein, said bore of said inlet portion includes a relatively narrow inlet passage in communication with the inlet of said casing, a relatively wide mixing passage spaced from said inlet portion for receiving said mixer, a diverging passage extending between said inlet passage and said mixing passage and a converging portion extending between said mixing passage and said outlet portion, and, said mixer including a diverging nose portion having an outer surface that is generally offset from said inside wall of said diverging passage and a converging tail portion having an outer surface generally offset from said converging portion.

3. The mixing nozzle of claim 1, wherein, said passage of said mixing portion includes a relatively narrow inlet passage in communication with the inlet of said casing, a relatively wide mixing passage spaced from said inlet portion for receiving said mixer and a diverging passage extending between said inlet passage and said mixing passage, said bore of said outlet portion includes a relatively wide first cylindrical portion adjacent to the front end of said outlet portion, a relatively narrow second cylindrical portion in communication with the outlet of said outlet portion and a converging portion extending between said first and second cylindrical portions, and said mixer includes a nose portion having an outer surface that is generally offset and compatible with said inside wall of said diverging passage and a tail portion extending behind said tail flange having outer surfaces that are generally offset and compatible with the inside walls of said first cylindrical portion and the inside wall of said converging portion.

4. The mixing nozzle of claim 1, wherein, said at least one notch in said at least one barrier land is a plurality of notches in at least one barrier land which increase in depth from the downstream end toward the upstream end.

5. The mixing nozzle of claim 1, wherein, said at least one notch in said at least one barrier land is a plurality of notches in at least one barrier land which increase in increase in width from the upstream end toward the downstream end.

6. The mixing nozzle of claim 1, wherein, said at least one notch in said at least one barrier land is a plurality of notches in at least one barrier land which increase in depth from the downstream end toward the upstream end and increase in width from the upstream end toward the downstream end.

7. The mixing nozzle of claim 1, wherein, said at least one notch in said at least one barrier land is a plurality of notches in at least one barrier land which increase in depth from the downstream end toward the upstream end and increase in width from the upstream end toward the downstream end and said notches have approximately similar cross sectional areas.

8. A mixing nozzle for receiving extrudate from a thermoplastic processing device, mixing said extrudate and discharging mixed extrudate, comprising:

(a) a casing having an inlet portion, a mixing portion and an outlet portion (b) a mixer that fits within said mixing portion including;
(i) a body portion which is generally cylindrical about an axis
(ii) an nose portion that is oriented toward the upstream end of said mixing portion,
(iii) a tail portion extending behind the downstream end of said body portion,
(iv) a tail flange extending from said body portion of said mixer for clamping between the mixing portion and the outlet portion of the casing for securing said mixer within said casing,
(v) elongated flow directing lands extending from the upstream end of said body portion to the downstream end of said body portion and extending radially to match the inside wall of said casing, the flow directing lands having a first helix angle with respect to the axis of said body portion,
(vi) elongated barrier lands extending from the upstream end of said body portion to the downstream end of said body portion in a paired alternating relationship with said flow directing lands, said barrier lands offset from the inside wall of the casing, and including transverse notches, the barrier lands having a second helix angle that is greater than said first helix angle,
(vii) inlet channels defined by first pairs of flow directing lands and barrier lands that converge in the downstream direction, such that said inlet channels are relatively closed in the downstream direction and relatively open in the upstream direction for communication with the upstream end of said casing,
(viii) outlet channels defined by second alternating pairs of barrier lands and flow directing lands that diverge in the downstream direction defining outlet channels, such that said outlet channels are relatively closed in the upstream direction and relatively open in the downstream direction for communication with the downstream end of said casing, whereby said extrudate is received by said inlet end of said casing, and is received primarily by said inlet channels, passes over said barrier lands and through said notches of said barrier lands and into said outlet channels in a mixing fashion and flows to said downstream end for discharge in an increasingly mixed condition.

9. The mixing nozzle of claim 8, wherein,
said notches in said barrier lands increase in depth from the downstream end toward the upstream end.

10. The mixing nozzle of claim 8, wherein,
said notches in said barrier lands increase in width from the upstream end toward the downstream end.

11. The mixing nozzle of claim 8, wherein,
said notches in said barrier lands increase in depth from the downstream end toward the upstream end and said notches in said barrier lands increase in width from the upstream end toward the downstream end.

12. The mixing nozzle of claim 8, wherein,
said notches in said barrier lands increase in depth from the downstream end toward the upstream end and said notches in said barrier lands increase in width from the upstream end toward the downstream end and wherein said notches have generally similar cross sectional areas.

13. The mixing nozzle of claim 1, wherein,
said helix angle of the barrier lands is approximately 50° and said helix angle of the flow directing lands is approximately 40°.

14. The mixing nozzle of claim 1, wherein,
each said barrier land widens at its upstream end to form an upstream offset surface adjacent to the upstream end of a flow directing land and each barrier land also widens at its downstream end to form a downstream offset surface adjacent to a downstream end of a flow directing land, said upstream and downstream offset surfaces offset from said inside surface of said casing.

* * * * *